(12) United States Patent
Quest et al.

(10) Patent No.: US 7,124,598 B2
(45) Date of Patent: Oct. 24, 2006

(54) PRESSURE TESTING AND REFRIGERANT RECHARGING CONDUIT ASSEMBLY FOR AUTOMOBILES

(75) Inventors: William J. Quest, Dallas, TX (US); Kerry W. Whitaker, Plano, TX (US)

(73) Assignee: E.F. Products, Inc., Dallas, TX (US)

( * ) Notice: Subject to any disclaimer, the term of this patent is extended or adjusted under 35 U.S.C. 154(b) by 50 days.

(21) Appl. No.: 10/973,570

(22) Filed: Oct. 26, 2004

(65) Prior Publication Data

US 2006/0086123 A1    Apr. 27, 2006

(51) Int. Cl.
*F25B 45/00* (2006.01)
(52) U.S. Cl. ............................................. 62/292; 62/77
(58) Field of Classification Search ................. 62/292, 62/77, 149
See application file for complete search history.

(56) References Cited

U.S. PATENT DOCUMENTS

| | | | |
|---|---|---|---|
| 2,185,332 A | 1/1940 | Crampton ...................... 252/5 |
| 3,712,113 A | 1/1973 | Roscoe .......................... 73/37 |
| 3,785,163 A | 1/1974 | Wagner ......................... 62/77 |
| 3,813,893 A | 6/1974 | Gemender et al. ............. 62/129 |
| 3,916,641 A | 11/1975 | Mullins ........................ 62/292 |
| 3,943,987 A | 3/1976 | Rossi .......................... 150/0.5 |
| 3,976,110 A | 8/1976 | White ......................... 141/346 |
| 3,996,965 A | 12/1976 | Peters .................... 137/625.66 |
| 4,103,534 A | 8/1978 | Hoof ............................. 73/37 |
| 4,110,998 A | 9/1978 | Owen .......................... 62/125 |
| 4,338,793 A * | 7/1982 | O'Hern, Jr. et al. ........... 62/292 |
| 4,379,067 A | 4/1983 | Packo et al. .................... 252/67 |
| 4,404,850 A | 9/1983 | Hickmann ..................... 73/161 |
| 4,494,402 A | 1/1985 | Carney ........................... 73/40 |
| 4,535,802 A | 8/1985 | Robertson ..................... 137/322 |
| 4,884,410 A | 12/1989 | Bell et al. ...................... 62/77 |
| 4,921,004 A | 5/1990 | Lane et al. |
| 5,070,917 A | 12/1991 | Ferris et al. ................... 141/38 |
| 5,143,236 A | 9/1992 | Gueret ......................... 215/311 |
| 5,167,140 A | 12/1992 | Cooper et al. ............... 73/40.7 |
| 5,282,366 A * | 2/1994 | Reilly et al. .................. 62/292 |
| 5,333,467 A * | 8/1994 | Pearl et al. ..................... 62/77 |
| 5,361,594 A | 11/1994 | Young |
| 5,417,873 A | 5/1995 | Packo .......................... 252/72 |

(Continued)

OTHER PUBLICATIONS

PCT, "Search Report," for International Application No. PCT/US 01/48875, mailed Jul. 19, 2002; 3 pages.

(Continued)

*Primary Examiner*—Melvin Jones
(74) *Attorney, Agent, or Firm*—Meyertons, Hood, Kivlin, Kowert & Goetzel, P.C.; Eric B. Meyertons

(57) ABSTRACT

A combination pressure measurement/charging system may include a conduit coupled to a refrigerant can. The conduit may be coupled to a low-pressure side of a refrigerant system. The system may include a valve to control a flow of fluid through the conduit. Thus, a flow of fluid between the refrigerant can and the low-pressure side of the refrigerant system may be controlled using the valve. A first pressure gauge may be in fluid communication with the conduit. The first pressure gauge may be coupled to the low-pressure side of the refrigerant system. The first pressure gauge may be used to operate the valve to control fluid flow through the conduit. A second pressure gauge may be coupled to a high-pressure side of the refrigerant system. The second pressure gauge may be isolated from fluids that flow through the conduit.

35 Claims, 12 Drawing Sheets

U.S. PATENT DOCUMENTS

| | | | |
|---|---|---|---|
| 5,540,254 A | 7/1996 | McGowan et al. | 137/315.01 |
| 5,560,215 A * | 10/1996 | Talarico | 62/149 |
| 5,678,415 A | 10/1997 | Peckjian et al. | |
| 5,827,050 A | 10/1998 | Price | 417/207 |
| 5,842,349 A | 12/1998 | Wakita et al. | 62/85 |
| 5,882,543 A | 3/1999 | Peterson et al. | 252/72 |
| 5,967,204 A | 10/1999 | Ferris et al. | 141/383 |
| 5,975,151 A | 11/1999 | Packo | 141/3 |
| 5,996,651 A | 12/1999 | Scaringe | 141/98 |
| 5,999,700 A | 12/1999 | Geers | 392/441 |
| 6,089,032 A | 7/2000 | Trachtenberg | 62/149 |
| 6,170,541 B1 | 1/2001 | Sanhaji | 141/98 |
| 6,183,663 B1 | 2/2001 | Kalley et al. | 252/68 |
| 6,360,554 B1 | 3/2002 | Trachtenberg | |
| 6,385,986 B1 | 5/2002 | Ferris et al. | 62/292 |
| 6,438,970 B1 | 8/2002 | Ferris et al. | 62/77 |
| 6,446,453 B1 | 9/2002 | Trachtenberg | 62/292 |
| 6,481,221 B1 | 11/2002 | Ferris et al. | 62/77 |
| 6,609,385 B1 | 8/2003 | Ferris et al. | 62/77 |
| 6,722,141 B1 | 4/2004 | Ferris et al. | 62/77 |
| 6,796,340 B1 | 9/2004 | Ferris et al. | 141/67 |
| 2002/0189265 A1 | 12/2002 | Ferris et al. | 62/77 |
| 2004/0079092 A1 | 4/2004 | Ferris et al. | 62/77 |

OTHER PUBLICATIONS

PCT, "Search Report," for International Application No. PCT/US 02/06597, mailed Jul. 22, 2002; 3 pages.

Product Brochure entitled "Recharge & Measuring Kit", Interdynamics, Inc. 1993; 15 pages.

* cited by examiner

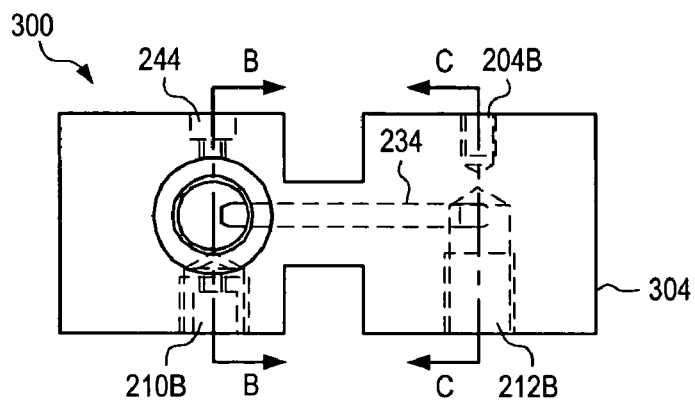
FIG. 7A
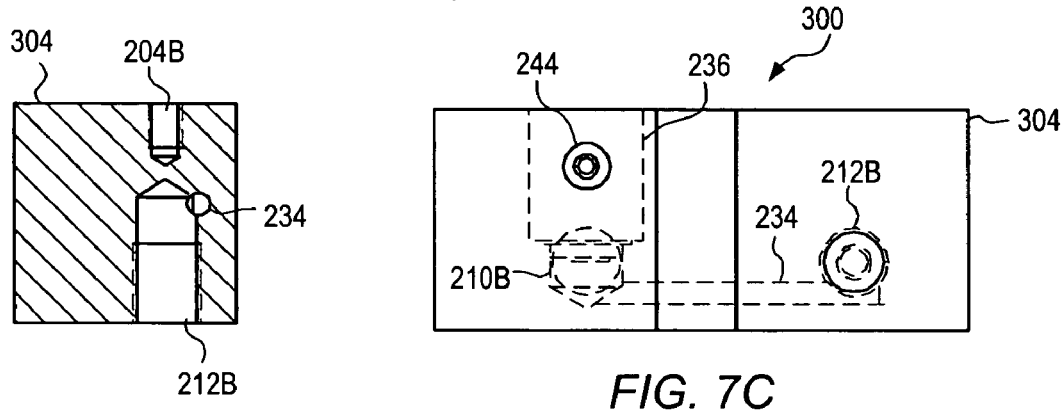
FIG. 7B
FIG. 7C
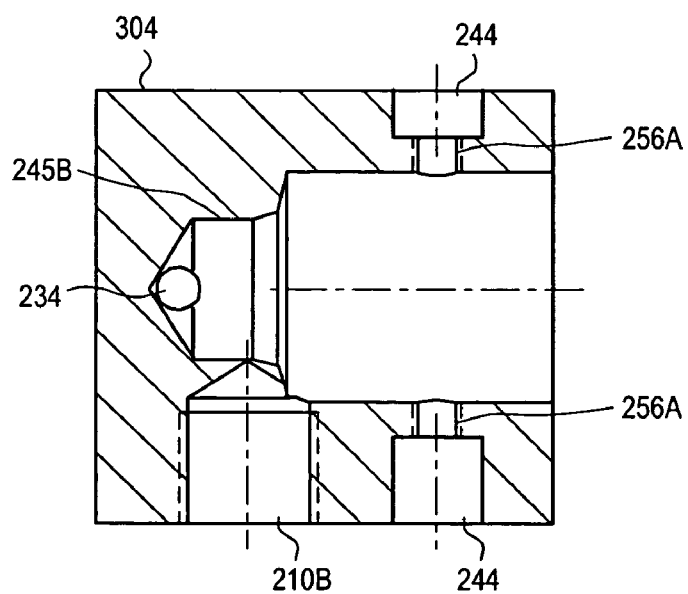
FIG. 7D

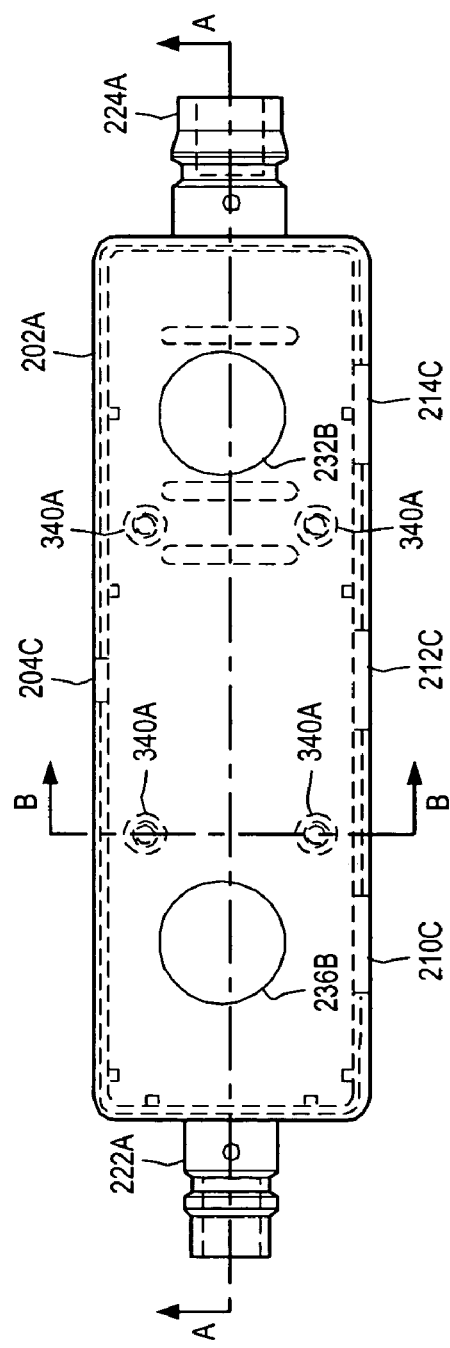
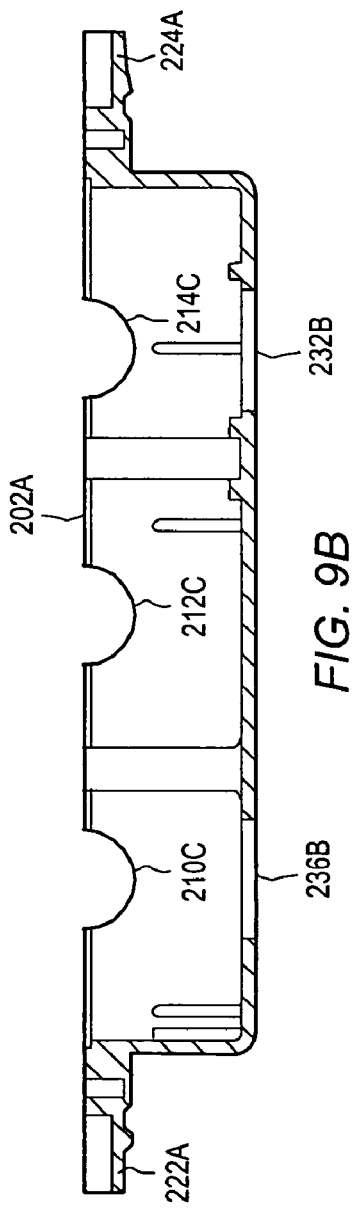
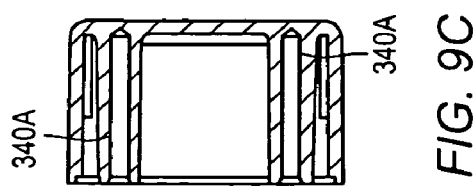

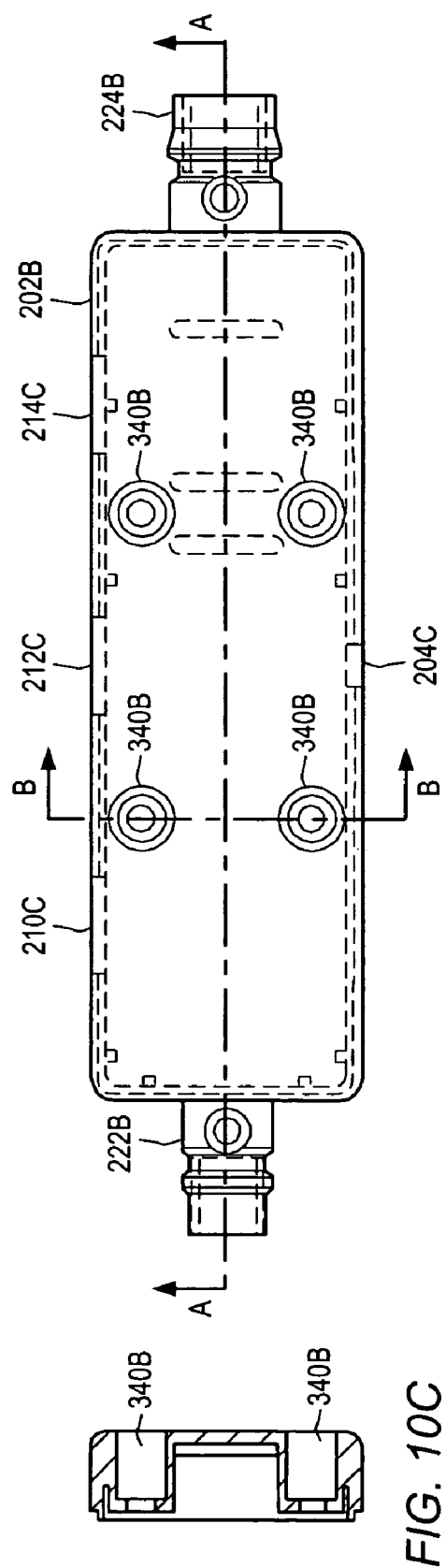
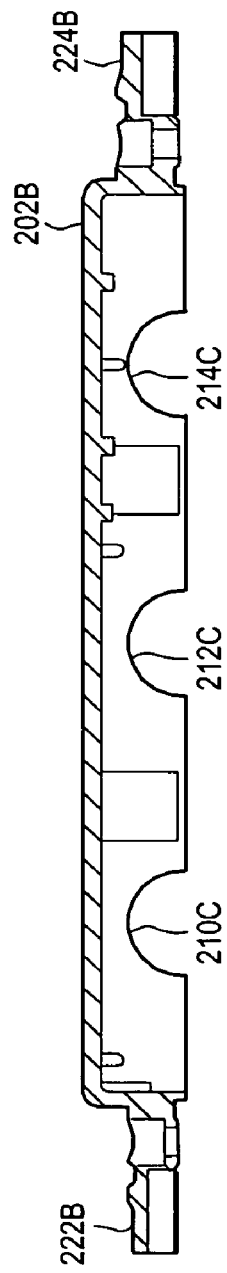
FIG. 10A
FIG. 10B
FIG. 10C

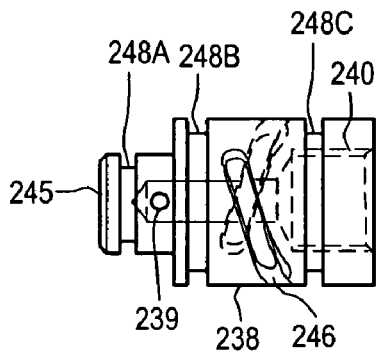
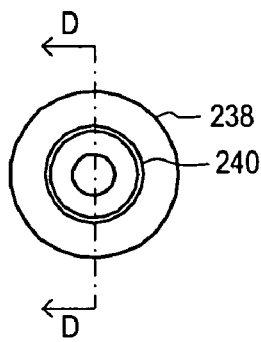
FIG. 11C
FIG. 11A
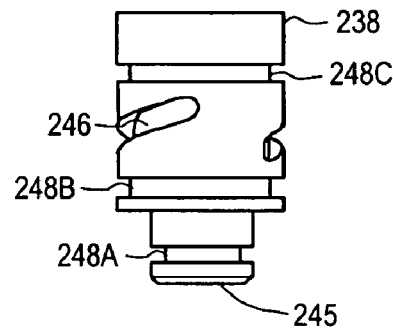
FIG. 11B
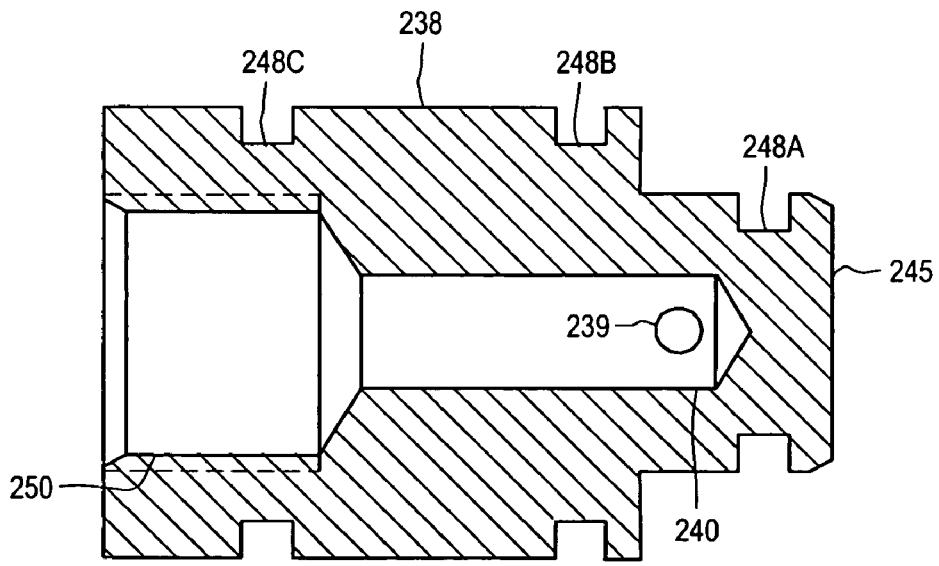
FIG. 11D

PRESSURE TESTING AND REFRIGERANT RECHARGING CONDUIT ASSEMBLY FOR AUTOMOBILES

BACKGROUND

1. Field of the Invention

The present invention generally relates to refrigerant charging apparatus. Certain embodiments relate to refrigerant charging and pressure testing assemblies useable to charge a refrigerant system (e.g., a motor vehicle refrigerant system).

2. Description of Related Art

One common technique for assessing the refrigerant charge of a refrigerant system (e.g., an automotive vehicle air conditioning system) is to check the pressure within the refrigerant system by coupling an end of a pressure gauge hose assembly to a service fitting portion of the refrigerant system (e.g., a low-pressure side fitting of the refrigerant system). The pressure gauge may be read, and the pressure gauge hose assembly may be removed from the refrigerant system. If the pressure gauge reading indicates that the refrigerant charge is below a desired level, a charging hose assembly may then be coupled to the refrigerant system, and refrigerant may be added to the refrigerant system through the charging hose assembly.

A first end of a charging hose assembly typically includes a coupling, which may be releasably coupled to the service fitting. A second end of the charging hose assembly typically includes a shutoff valve that may be secured to an outlet of a pressurized refrigerant container (e.g., a refrigerant can). During use, the charging hose assembly is coupled to the service fitting of the refrigerant system and the valve is opened to allow refrigerant to flow into the refrigerant system from the pressurized refrigerant container. After allowing some refrigerant to flow into the refrigerant system, the charging hose assembly may be removed from the service fitting. The pressure gauge hose assembly is again coupled to the service fitting to assess a refrigerant charge of the refrigerant system. After the refrigerant charge is assessed, the pressure gauge hose assembly may be removed from the refrigerant system.

If the refrigerant charge is below a desired level, the charging hose assembly may be reattached to the service fitting and more refrigerant may be added to the refrigerant system. The refrigerant charge may then be reassessed with the pressure gauge hose assembly. These steps may be repeated, using the separate hose assemblies, until the measured pressure within the refrigerant system indicates that the refrigerant system is adequately charged with refrigerant.

U.S. Pat. No. 6,609,385 to Ferris et al. and U.S. Patent Application Publication No. 20040079092 to Ferris et al., each of which is incorporated by reference as if fully set forth herein, disclose a refrigerant charging/pressure testing hose assembly that is useable to both check the pressure in a refrigerant system and, if necessary, add refrigerant to the refrigerant system. The assembly includes a refrigerant hose with a quick disconnect coupler at one end that is connectable to a service fitting of a refrigerant system, a piercing-type shutoff valve at the other end that is connectable to a refrigerant container, a pressure gauge coupled into an intermediate portion of the hose, and a check valve in the hose between the shutoff valve and the pressure gauge.

Some manifold assemblies may also be used to pressure test and/or charge a refrigerant system. For example, QUEST™ brand part# 413 (available from EF Products, Inc., Dallas, Tex.) is an R-134a Manifold Gauge for use by professional service personnel. Part# 413 includes two pressure gauges. One pressure gauge may be coupled to the low-pressure side of a refrigerant system using a hose. The other pressure gauge may be coupled to the high-pressure side of the refrigerant system using a hose. Both of the gauges are coupled to handle-operated valves that open and close flow to the pressure gauges from the hoses. In the manifold, both pressure gauges and both hoses (i.e., the low-pressure side of the refrigerant system and the high-pressure side of the refrigerant system) are in fluid communication with a third hose that may be coupled to a refrigerant container (either a 30 lb. cylinder of refrigerant or, with an adapter, a refrigerant can). Thus, the refrigerant system may be charged through the low-pressure side or the high-pressure side of the refrigerant system. Charging of a refrigerant system through the high-pressure side of the refrigerant system may be dangerous and should only be performed by professional service personnel.

SUMMARY

In an embodiment, a combination pressure measurement/refrigerant charging apparatus may include a shutoff valve. The shutoff valve may include a piercing pin and a pressure gauge. The piercing pin may be used to pierce a refrigerant can during use. The pressure gauge may be used as a handle for operating the shutoff valve during use. A first end of a hose may be coupled to the shutoff valve. A quick coupling device may be coupled to a second end of the hose. The quick coupling device may be used to couple the apparatus to a refrigerant system. In some embodiments, the quick coupling device may only couple to a low-pressure side of the refrigerant system.

A pressure of the refrigerant system may be measured when the shutoff valve is closed. Fluid, either a liquid or a gas, may be allowed to flow from the refrigerant can to the refrigerant system when the shutoff valve is open. The piercing pin may be moved back and forth relative to a sealing seat by operating (e.g., rotating) the pressure gauge. This movement of the piercing pin may open and close the shutoff valve.

In an embodiment, a combination pressure measurement/refrigerant charging system may include a conduit. The conduit may be coupled to a refrigerant can and to a low-pressure side of a refrigerant system. The pressure measurement/refrigerant recharging system may include a valve. The valve may control a flow of fluid through the conduit. Thus, the valve may control the flow of fluid between the refrigerant can and the low-pressure side of the refrigerant system.

In certain embodiments, a first pressure gauge may be in fluid communication with the conduit. The first pressure gauge may be coupled to the low-pressure side of the refrigerant system. The first pressure gauge may operate the valve to control fluid flow through the conduit. A second pressure gauge may be coupled to a high-pressure side of the refrigerant system. The second pressure gauge may be isolated from fluids that flow through the conduit.

In certain embodiments, the conduit and the valve may be located inside a body (e.g., a manifold). The first pressure gauge and the second pressure gauge may be coupled to the body. A hose may couple the conduit to a refrigerant can. A can piercing valve may be coupled to an end of the hose that is coupled to a refrigerant can. A second hose may couple the first pressure gauge to the low-pressure side of the refrigerant system. A third hose may couple the second pressure gauge to the high-pressure side of the refrigerant system. The second and third hoses may include shutoff valves and/or quick coupling devices. The quick coupling devices may be used for coupling to the refrigerant system.

In an embodiment, the first pressure gauge may be used as a handle to operate (e.g., open and close) the valve. Closing the valve may allow a pressure of the low-pressure side of the refrigerant system to be measured. Opening the valve may allow fluid to flow from the refrigerant can to the refrigerant system.

The valve may include a pin and a sealing seat. The valve may be closed when a portion of the pin presses against the sealing seat. Operation (e.g., rotation) of the first pressure gauge may move the pin back and forth relative to the sealing seat. Thus, operation of the first pressure gauge may open and close the valve by moving the pin relative to the sealing seat.

BRIEF DESCRIPTION OF THE DRAWINGS

Advantages of the present invention may become apparent to those skilled in the art with the benefit of the following detailed description and upon reference to the accompanying drawings in which:

FIGS. 7A–7D depict cross-sectional representations of a low-pressure side of a pressure measurement and charging assembly.

FIGS. 9A–9C depict cross-sectional representations of an embodiment of an outer body front portion.

FIGS. 10A–10C depict cross-sectional representations of an embodiment of an outer body rear portion.

FIGS. 11A–11D depict an embodiment of a plunger.

Figure 1:
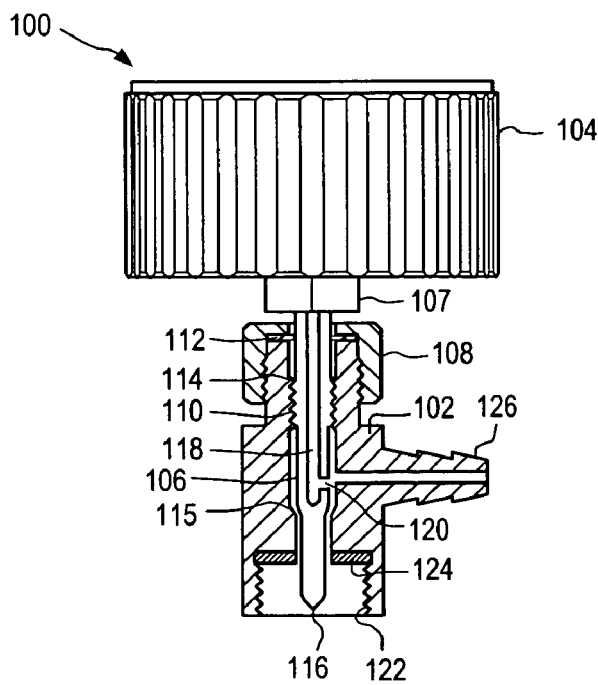
FIG. 1 depicts an embodiment of a pressure gauge and valve assembly.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

FIG. 1 depicts a cross-sectional representation of an embodiment of a pressure gauge and valve assembly. Assembly 100 may include body 102 and gauge 104. Gauge 104 may be a pressure gauge or other pressure measurement device. Gauge 104 may be used as a handle to operate assembly 100. In certain embodiments, gauge 104 may include ridges and/or other features that allow a user to grip and rotate the pressure gauge for use as a handle. Allowing gauge 104 to be used as a handle for operating assembly 100 may simplify the design of assembly 100 and/or reduce costs for manufacturing the assembly.

In certain embodiments, gauge 104 may be a dial-type pressure gauge. A dial-type pressure gauge may indicate one or more selected pressure ranges (e.g., normal pressure range, low pressure range, high or over pressure range, alert pressure range, and/or danger pressure range). The pressure ranges indicated on gauge 104 may be selected to represent pressure ranges based on a desired use for assembly 100 (e.g., a type of refrigerant used with the assembly or a type of refrigerant system intended for use with the assembly). In some embodiments, the indicated pressure ranges may be color-indexed to provide additional visual indication of the pressure ranges. In some embodiments, gauge 104 may be a digital readout pressure gauge.

Gauge 104 may be coupled to pin 106. Pin 106 may be coupled to gauge 104 such that a tight seal is formed between the pin and the gauge. For example, pin 106 may be coupled to gauge 104 using nut 107. In an embodiment, nut 107 may be a knurled press fitting. Nut 107 may be coupled (e.g., threaded, glued, epoxied, and/or welded) to pin 106 and thread onto a threaded portion of gauge 104 to form a seal (e.g., a tight seal) between pin 106 and gauge 104. In some embodiments, the use of nut 107 to couple pin 106 to gauge 104 may be reversed. For example, nut 107 may be coupled to gauge 104 and thread onto a threaded portion of pin 106. In some embodiments, an o-ring or gasket inside nut 107 may provide a seal between pin 106, nut 107, and gauge 104.

In some embodiments, pin 106 may be permanently coupled to gauge 104. For example, pin 106 may be bonded (e.g., glued, epoxied, or welded) to gauge 104. In some embodiments, pin 106 may be formed as a portion of gauge 104. Pin 106 may be made of materials chemically inert to refrigerant (e.g., stainless steel or aluminum). Pin 106 may be coupled to gauge 104 such that the pin rotates when the gauge is turned.

Pin 106 and gauge 104 may be coupled to body 102 with nut 108. Nut 108 may be a retainer nut. An inside diameter of a portion of nut 108 may be slightly larger than the outside diameter of pin 106 so that the nut moves freely up and down the body of the pin. A portion of nut 108 may have an inside diameter that is less than a diameter of pin 106 at threads 110 so that the nut does not pass over the threads. Gasket 112 may be located inside nut 108 to provide a seal between pin 106, nut 108, and body 102. In some embodiments, gasket 112 may include one or more pieces that together provide a seal between pin 106, nut 108, and body 102. Gasket 112 may be made of one or more materials that are chemically inert to fluid in assembly 100.

Pin 106 may include threads 110. Threads 110 may engage threads 114 of body 102 such that rotation of gauge 104 rotates pin 106. Rotation of pin 106 may cause the pin to move along threads 110 and translate relative to body 102. As pin 106 translates relative to body 102, the pin may form a seal when pressed against seat 115. A portion of pin 106 that presses against seat 115 may be complementary to the shape of seat 115 so that a tight seal is formed between the pin and the seat. Sealing pin 106 against seat 115 may inhibit flow of fluids between a refrigerant can and a hose coupled to assembly 100. Thus, assembly 100 may operate as a shutoff valve between a refrigerant can and a hose coupled to the assembly.

In certain embodiments, pin 106 may include tip 116. Tip 116 may be a piercing tip (e.g., a can piercing tip). Tip 116 may be used to pierce a refrigerant can or other refrigerant container that may be coupled to assembly 100. Tip 116 may be formed of hardened material (e.g., stainless steel). In an embodiment, pin 106, including tip 116, is made of one material as a single formed body. In some embodiments, pin 106 may be made of two or more pieces.

Pin 106 may include hollow portion 118. Hollow portion 118 may be in fluid communication with gauge 104, as shown in FIG. 1. Hollow portion 118 may also be in fluid communication with the interior of body 102 through access port 120. Thus, gauge 104 may be used to measure a pressure of fluid (e.g., refrigerant) in body 102.

Body 102 may be made of one or more materials chemically inert to fluid (e.g., refrigerant) used in a refrigerant system. In certain embodiments, body 102 may include two or more pieces of differing materials that are coupled (e.g., bonded). For example, body 102 may have a plastic outer portion coupled to or bonded over a metal (e.g., brass) interior portion.

Body 102 may include can thread 122. Can thread 122 may be used to couple assembly 100 to a refrigerant container (e.g., a refrigerant can). A refrigerant container may have a threaded portion that mates with can thread 122. Gasket 124 may be used to provide a seal between body 102 and a refrigerant container. Gasket 124 may be made of one or more materials that are chemically inert to fluid from a refrigerant container. In certain embodiments, a refrigerant can may be coupled to assembly 100 with pin 106 and tip 116 in a recessed position such that the refrigerant can is not pierced as the can is coupled to the assembly.

In certain embodiments, can thread 122 may be selected to mate exclusively with a threaded portion of certain refrigerant containers. For example, can thread 122 may only mate with a threaded portion of an R-134a refrigerant container.

Body 102 may include hose coupler 126. Hose coupler 126 may be, for example, a hose barb or other device for coupling a refrigerant hose to assembly 100. In certain embodiments, a hose may be permanently attached to hose coupler 126. For example, a hose may be crimped to hose coupler 126 (e.g., the hose may be crimped over the hose coupler using a metal crimp sleeve). A hose may be coupled to hose coupler 126, however, using any method known in the art.

Figure 2:
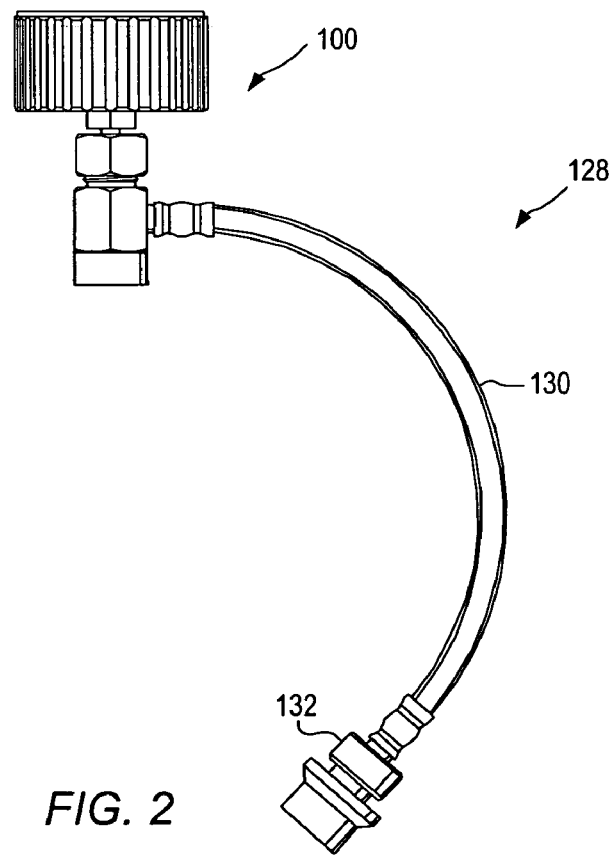
FIG. 2 depicts an embodiment of a pressure gauge, valve, and hose apparatus.

FIG. 2 depicts an embodiment of a pressure gauge, valve, and hose apparatus. Apparatus 128 may include assembly 100, hose 130, and coupling device 132. Apparatus 128 may be used for pressure testing and/or charging of a refrigerant system (e.g., a motor vehicle refrigerant system). In certain embodiments, apparatus 128 may be used with a refrigerant system that uses R-134a as the refrigerant fluid. Hose 130 may be coupled (e.g., connected with one or more intervening members) to assembly 100 and coupling device 132. In certain embodiments, hose 130 may be directly attached to assembly 100 and to coupling device 132. Assembly 100 and coupling device 132 may be coupled to hose 130 with a hose coupler and crimping the hose as described above or by any method known in the art. Hose 130 may be a flexible hose. Hose 130 may be made of materials that are chemically inert to refrigerant fluid including, but not limited to, rubber, polyvinylchloride, polyethylene, polypropylene, polytetrafluoroethylene, and mixtures thereof. Hose 130 may be 12" or less in length. Longer lengths of hoses may require a shutoff valve at some point along the length of the hose to satisfy Environmental Protection Agency (EPA) regulations.

In an embodiment, coupling device 132 may be a quick coupling device (e.g., a 14 mm×13 mm quick coupler device). Coupling device 132 may couple to an inlet port of a refrigerant system (e.g., a motor vehicle refrigerant system). Coupling device 132 may be coupled to an inlet port of a refrigerant system by pulling back an outer connector ring as the coupling device is pushed onto the inlet port. In certain embodiments, coupling device 132 may be designed to be coupled to only one side of a refrigerant system (e.g., a low-pressure side). Designing coupling device 132 to only couple to the low-pressure side of a refrigerant system may inhibit a user from accidentally coupling apparatus 128 to a high-pressure side of the refrigerant system, thus avoiding potential safety hazards.

Figure 3:
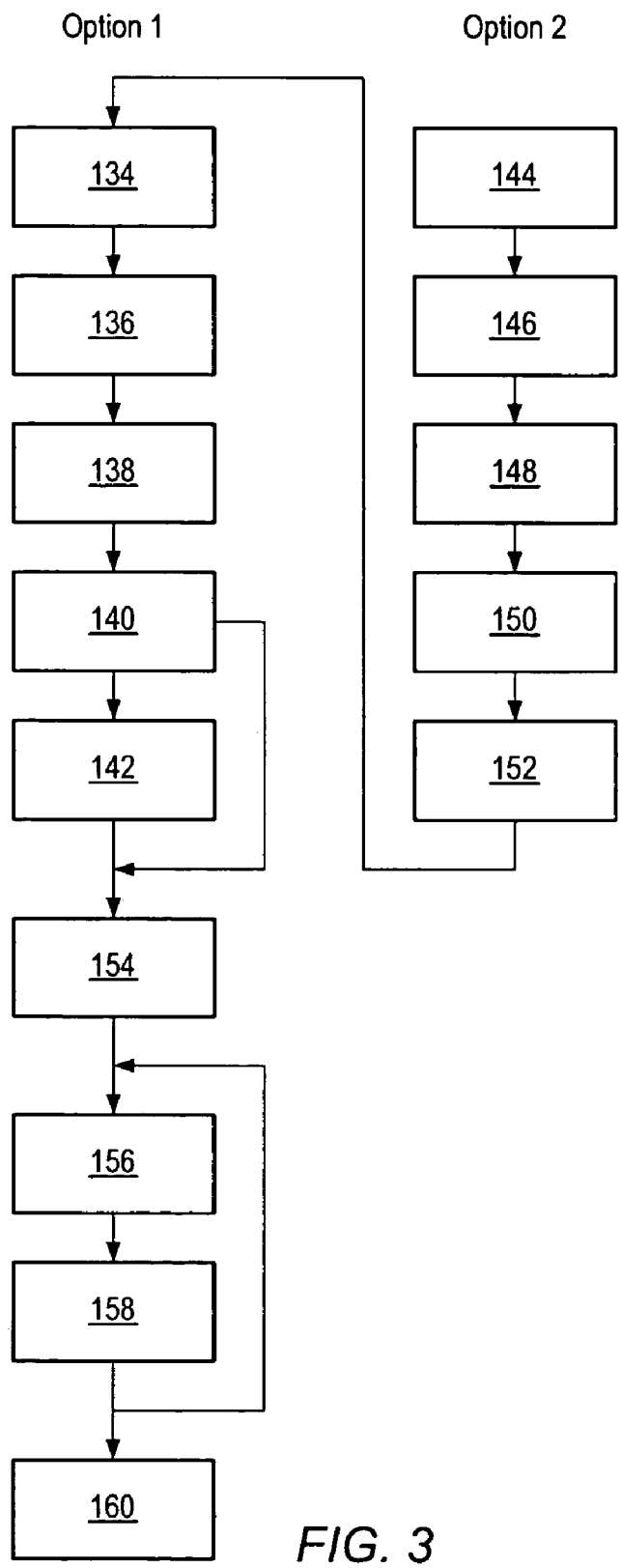
FIG. 3 depicts a flowchart of an embodiment of a method for pressure testing and/or recharging a refrigerant system.

In certain embodiments, apparatus 128 may be used as both a gauge for measuring a pressure of a refrigerant system (e.g., a motor vehicle refrigerant system) and a valve for opening and closing a refrigerant container attached to the apparatus (i.e., as a shutoff valve for the refrigerant container). FIG. 3 depicts a flowchart of an embodiment of a method for pressure testing and/or recharging a refrigerant system (e.g., a motor vehicle refrigerant system) using apparatus 128. Steps in the method depicted in FIG. 3 may reference elements identified in the embodiments depicted in FIGS. 1 and 2. In certain embodiments, the pressure of a low-pressure side of refrigerant system may be measured with or without a refrigerant can coupled to apparatus 128 by using Option 1 or Option 2, respectively, depicted in FIG. 3.

In Option 1, gauge 104 is rotated (e.g., counterclockwise) until tip 116 is in a retracted position (step 134). With tip 116 in a retracted position, accidental piercing of a refrigerant can may be avoided during coupling of apparatus 128 to the refrigerant can. A refrigerant can may then be coupled to apparatus 128 using can thread 122 (step 136). A user may start the refrigerant system (e.g., by starting the engine of a motor vehicle) and operate the refrigerant system at maximum cooling (step 138). Coupling device 132 may be coupled to a low-pressure side service port of the refrigerant system (step 140). (If coupling device 132 is coupled to the high-pressure side service port of the refrigerant system, explosion of the refrigerant can may result.) After coupling to the refrigerant system, gauge 104 may be used to measure a low-pressure side pressure of the refrigerant system (step 142). The measured pressure may be compared to an ambient temperature pressure measurement chart (e.g., a chart supplied with apparatus 128) or adjusted (e.g., corrected) in any other way known in the art to provide a more accurate pressure assessment based on ambient temperature of the environment.

In Option 2, gauge 104 is rotated (e.g., counterclockwise) until tip 116 is extended (e.g., fully extended) (step 144). Extension of tip 116 may inhibit refrigerant from escaping apparatus 128 during pressure measurement. A user may start the refrigerant system (e.g., by starting the engine of a motor vehicle) and operate the refrigerant system at maximum cooling (step 146). Coupling device 132 may be coupled to a low-pressure side service port of the refrigerant system (step 148). After coupling to the refrigerant system, gauge 104 may be used to measure a low-pressure side pressure of the refrigerant system (step 150). The measured pressure may be corrected to provide more accurate pressure assessment based on ambient temperature of the environment. Apparatus 128 may be disconnected from the refrigerant system after measuring the pressure and before a refrigerant can is attached to the apparatus (step 152).

If the pressure measured in step 142 or in step 150 indicates that a refrigerant level in the refrigerant system is below a desired level, apparatus 128 may be used to supply refrigerant to the refrigerant system. If Option 2 was used to measure the pressure, steps 134, 136, 138, and 140 may be used to couple apparatus 128 to a refrigerant can. Step 142 may be skipped and the user may begin charging of the refrigerant system at step 154. If Option 1 was used to measure the pressure, a user may begin charging of the refrigerant system at step 154.

In step 154, gauge 104 may be rotated (e.g., clockwise) until tip 116 punctures the refrigerant can. Gauge 104 may then be rotated in an opposite direction (e.g., counterclockwise) to allow refrigerant to enter apparatus 128 (step 156). A user may hear refrigerant leaving the refrigerant can. After allowing at least some refrigerant to enter the refrigerant system, the user may rotate gauge 104 to close off the flow of refrigerant. A pressure of the refrigerant system may be assessed (step 158). If the refrigerant system pressure is still too low, steps 156 and 158 may be repeated until a sufficient refrigerant system pressure is achieved. After sufficiently filling the refrigerant system with refrigerant, apparatus 128 may be uncoupled from the refrigerant system (step 160).

An empty refrigerant can may be uncoupled from apparatus 128 and disposed of properly (e.g., recycled). Apparatus 128 may be stored with tip 116 retracted, thus inhibiting accidental piercing of a next refrigerant can coupled to the apparatus. If the refrigerant can is not empty, the refrigerant can may remain coupled to apparatus 128 for later use. Care should be taken in storing apparatus 128 and the refrigerant can to inhibit accidental opening and/or puncturing of the refrigerant can.

Figure 4:
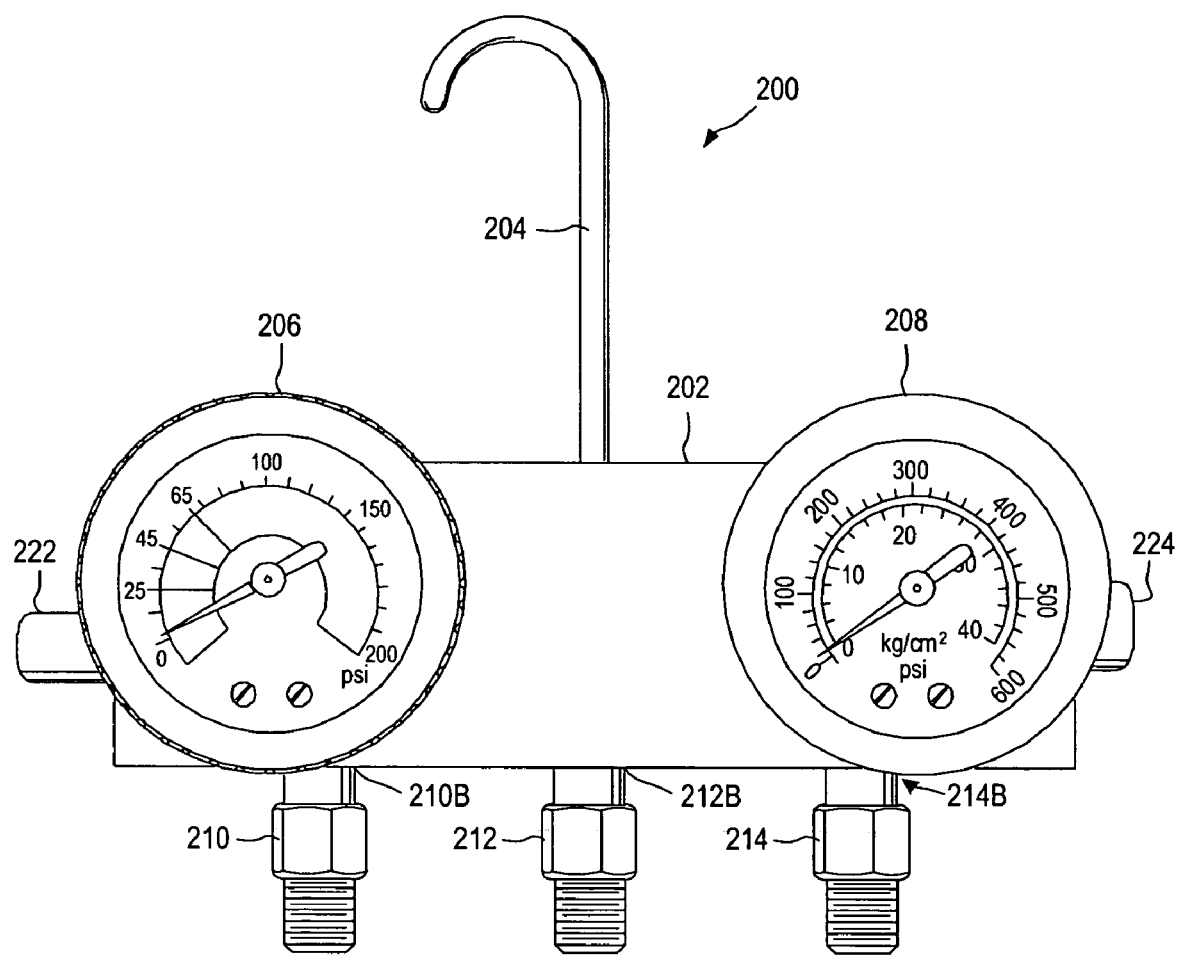
FIG. 4 depicts an embodiment of a pressure measurement and charging assembly.

FIG. 4 depicts an embodiment of pressure measurement and charging assembly 200. Assembly 200 may be used for assessing pressure and/or charging of a refrigerant system (e.g., a motor vehicle refrigerant system). In certain embodiments, assembly 200 may be used with a refrigerant system that uses R-134a as the refrigerant fluid. Assembly 200 may include outer body 202. Outer body 202 may be made of, for example, aluminum and/or one or more other materials (e.g., plastic) that are chemically inert to refrigerant fluid. Hanger 204 may be coupled to outer body 202. Hanger 204 may be used to hang or support assembly 200 during use (e.g., from a hood of a motor vehicle) and/or during storage of the assembly. In some embodiments, hanger 204 may be threaded into outer body 202. Hanger 204 may have a length, for example, of about 6".

Assembly 200 may include low-pressure side gauge 206 and high-pressure side gauge 208. Low-pressure side gauge 206 may be used to measure a low-pressure side pressure of a refrigerant system. High-pressure side gauge 208 may be used to measure a high-pressure side pressure of a refrigerant system. Gauge 206 and/or gauge 208 may be dial-type pressure gauges. A dial-type pressure gauge may include one or more selected pressure ranges (e.g., normal pressure range, low pressure range, high or over pressure range, alert pressure range, and/or danger pressure range). Pressure ranges indicated on gauges 206, 208 may be chosen to represent pressure ranges based on a desired use for assembly 200. For example, low-pressure side gauge 206 may have a lower pressure range (e.g., 0 psi to about 200 psi) than high-pressure side gauge 208 (e.g., 0 psi to about 600 psi), as shown in FIG. 4. In some embodiments, the indicated pressure ranges may be color-indexed to provide additional visual identification of the pressure ranges. In some embodiments, gauges 206, 208 may be digital readout pressure gauges. In some embodiments, gauges 206, 208 may be located on top of outer body 202 (e.g., on the same side of outer body 202 as hanger 204).

Figure 5:
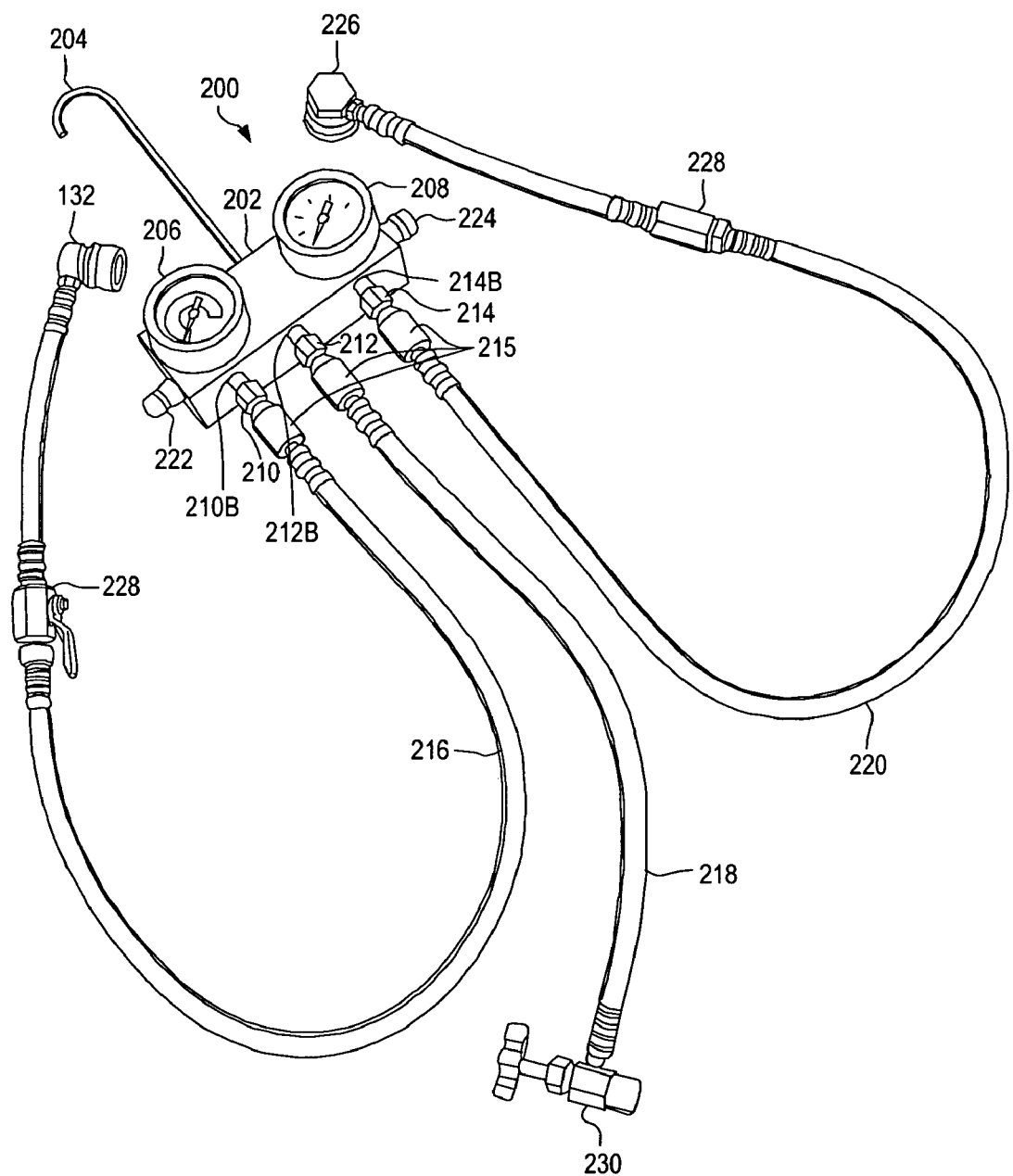
FIG. 5 depicts an embodiment of a pressure measurement and charging assembly with hoses.

Assembly 200 may include low-pressure side coupler 210, refrigerant can coupler 212, and high-pressure side coupler 214. FIG. 5 depicts an embodiment of a pressure measurement and charging assembly with hoses. Low-pressure side coupler 210 may be coupled to conduit 216 (e.g., a hose) that is coupled to a low-pressure side inlet port of a refrigerant system. Refrigerant can coupler 212 may be coupled to conduit 218 (e.g., a hose) that is coupled to a refrigerant can. High-pressure side coupler 214 may be coupled to conduit 220 (e.g., a hose) that is coupled to a high-pressure side inlet port of a refrigerant system. In certain embodiments, couplers 210, 212, 214 may be coupled to outer body 202. For example, couplers 210, 212, and/or 214 may be double male-NPT (National Pipe Thread) fittings with one end for coupling to outer body 202 (at openings 210B, 212B, and 214B, respectively) and one end for coupling to conduits or hoses. In this case, conduits (e.g., conduits 216, 218, 220) or hoses that are coupled to the couplers may use fittings 215 that are NPT fittings (e.g., female NPT fittings). Other types of hose or conduit fittings known in the art may also be used. In some embodiments, couplers 210, 212, and/or 214 may be formed as part of outer body 202.

In some embodiments, assembly 200 may include low-pressure side storage fitting 222 and/or high-pressure side storage fitting 224 (shown in FIGS. 4 and 5). In some embodiments, low-pressure side storage fitting 222 may be a double-ended fitting with one end coupled to outer body 202 and one end for coupling to conduit 216. Low-pressure side storage fitting 222 may be coupled to conduit 216 using coupling device 132 to store the conduit when the conduit is not in use. In some embodiments, high-pressure side storage fitting 224 may be a double-ended fitting with one end coupled to outer body 202 and one end for coupling to conduit 220. High-pressure side storage fitting 224 may be coupled to conduit 220 using coupling device 226 to store the conduit when the conduit is not in use. Coupling device 226 may be a coupling device (e.g., a quick coupling device such as a 14 mm×16 mm quick coupler device) for coupling to a high-pressure side inlet port of a refrigerant system.

In certain embodiments, conduits 216, 220 may include one or more valves 228. Valves 228 may be shutoff valves (e.g., ball valves). Valve 228 may be located along a length of conduit 216 or conduit 220. In certain embodiments, valve 228 may be located 12" or less from coupling devices 132 and 226 along the length of conduit 216 or conduit 220. Valve 228 may be located within this distance to comply with EPA regulations.

In some embodiments, valve 230 may be located at an end of conduit 218. Valve 230 may be a can piercing type shutoff valve. Valve 230 may be used to pierce or puncture a top of a refrigerant can. In some embodiments, valve 230 may be a can piercing type shutoff valve for use only with 134a refrigerant cans. Valve 230 may also be used to regulate flow from the refrigerant can (i.e., valve 230 may operate as a shutoff valve for the refrigerant can). In some embodiments, valve 230 may not operate as a shutoff valve, but rather as an attachment that pierces a refrigerant can.

In certain embodiments, conduits 216, 218, and/or 220 may be differentiated by, for example, color. For example, conduit 216 may be a blue conduit, conduit 218 may be a yellow conduit, and conduit 220 may be a red conduit. Using different colors for conduits 216, 218, 220 may allow for easier and safer operation of assembly 200 by a user (e.g., by a non-professional user).

Figure 6:
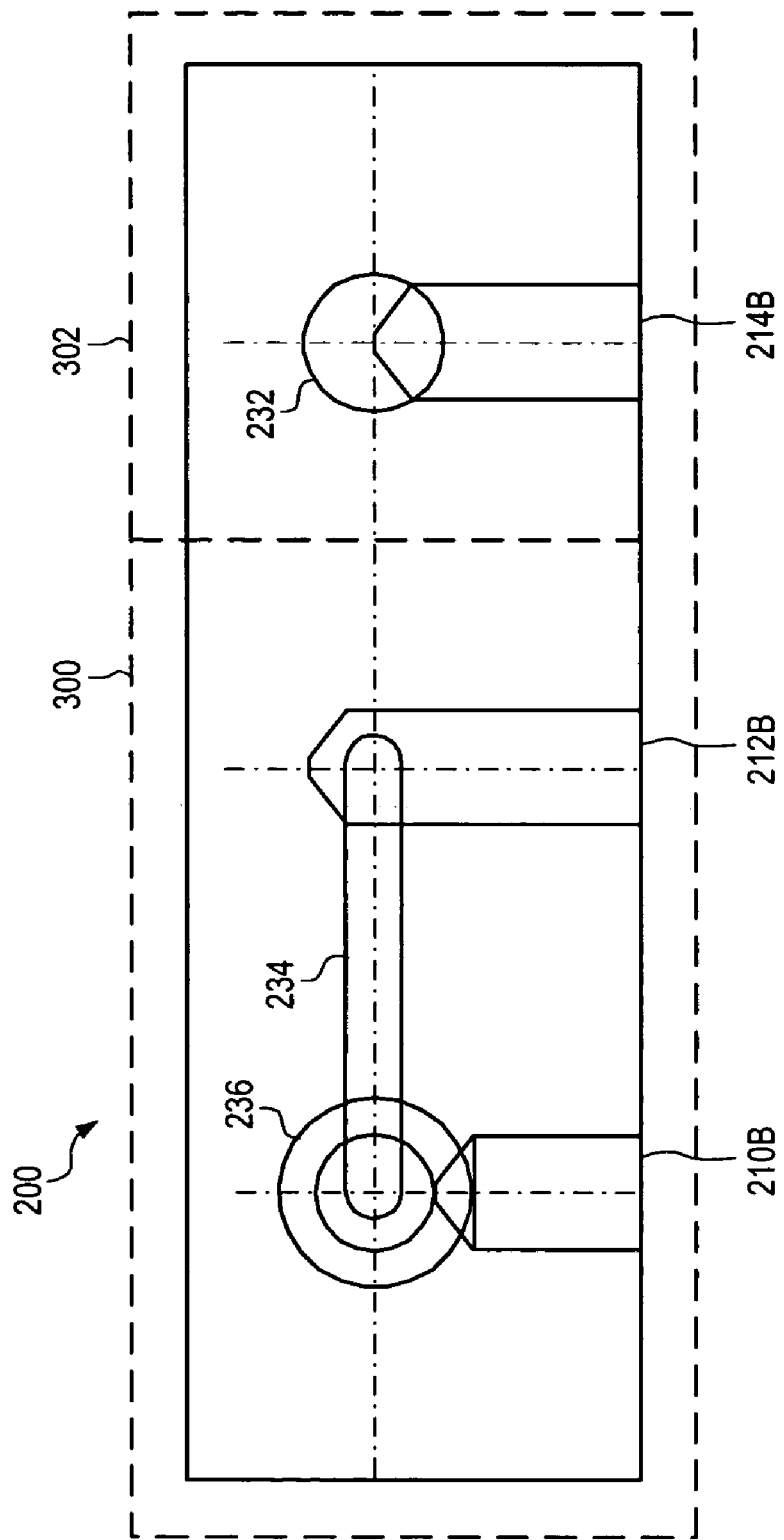
FIG. 6 depicts a schematic representation of a pressure measurement and charging assembly as depicted from a front-end view of the assembly.

FIG. 6 depicts a schematic representation of a pressure measurement and charging assembly as depicted from a front-end view of assembly 200. FIG. 6 depicts a schematic of the internal structure of an embodiment of assembly 200. Assembly 200 may be divided into two sections, low-pressure side 300 and high-pressure side 302. On high-pressure side 302, a gauge (e.g., high-pressure side gauge 208, depicted in FIGS. 4 and 5) may be coupled to opening 232. Opening 232 is in fluid communication with opening 214B. Thus, a gauge (e.g., high-pressure side gauge 208) may be used to measure a pressure of a high-pressure side of a refrigerant system coupled to opening 214B.

On low-pressure side 300, as shown in FIG. 6, opening 212B is in fluid communication with conduit 234. Conduit 234 may be in fluid communication with opening 210B and opening 236. Thus, refrigerant may be allowed to flow from a refrigerant can coupled to opening 212B to a low-pressure side of a refrigerant system coupled to opening 210B.

In an embodiment of assembly 200, fluid is not allowed to flow between opening 212B and opening 214B (i.e., between low-pressure side 300 and high-pressure side 302), which may be coupled to a high-pressure side of a refrigerant system. This configuration inhibits a user from accidentally attempting to charge the refrigerant system through the high-pressure side of the refrigerant system. Charging through a high-pressure side of a refrigerant system may be dangerous and should be attempted only by professional service personnel. Thus, assembly 200 may be easily and safely operated by both professional service personnel and non-professional consumers (e.g., motor vehicle owners).

FIGS. 7–12 depict one exemplary embodiment of assembly 200. It is to be understood that variations in the design, construction, and/or assembly of assembly 200 and one or more of its components may be made without deviating from the operation or function of assembly 200 as described herein. For example, assembly 200 may be designed and assembled using fewer pieces or parts (e.g., low-pressure side 300 and high-pressure side 302 may be a single piece cast body).

In certain embodiments, low-pressure side gauge 206 (depicted in FIGS. 4 and 5) may be operated as a valve (e.g., a shutoff valve) for controlling a flow of refrigerant between opening 212B and opening 210B in addition to being used to measure a pressure of a low-pressure side of a refrigerant system. FIG. 7A depicts a cross-sectional representation of low-pressure side 300 of assembly 200 from a front-end view. As shown in FIG. 7A, low-pressure side 300 may include low-pressure body 304. FIG. 7B depicts a cross-sectional representation of low-pressure body 304 along line C—C depicted in FIG. 7A. FIG. 7C depicts a cross-sectional representation of low-pressure body 304 from a bottom view. FIG. 7D depicts an expanded cross-sectional representation of low-pressure body 304 along line B—B depicted in FIG. 7A.

In certain embodiments, low-pressure body 304 may be a cast body (e.g., an aluminum die-cast body). Low-pressure body 304 may include opening 236. A gauge (e.g., gauge 206 depicted in FIGS. 4 and 5) may be coupled to opening 236. In certain embodiments, a gauge may be coupled to opening 236 using a plunger (e.g., plunger 238 depicted in FIGS. 11A–11D). Opening 236 may be in fluid communication with conduit 234, opening 212B, and opening 210B, as shown in FIGS. 6, 7A, and 7B. Openings 210B and/or 212B may be threaded (e.g., a ⅛" NPT female thread) to allow for coupling to the openings.

In certain embodiments, low-pressure body 304 may include hanger opening 204B. Hanger opening 204B may be used to couple to hanger 204, depicted in FIGS. 4 and 5. For example, hanger 204 may be threaded into hanger opening 204B.

In certain embodiments, low-pressure body 304 may include holes 244. Holes may include threaded portions 256A. Holes 244 and threaded portions 256A may be used to allow a pin (e.g., pin 241 depicted in FIGS. 12A and 12B) to be coupled to (e.g., located in) low-pressure body 304.

Figure 8A:
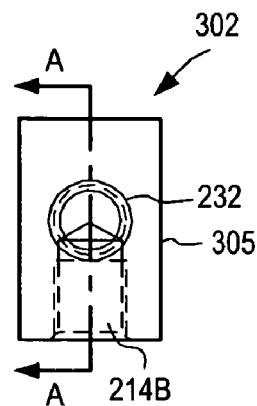
FIGS. 8A–8C depict cross-sectional representations of a low-pressure side of a pressure measurement and charging assembly.
Figure 8B:
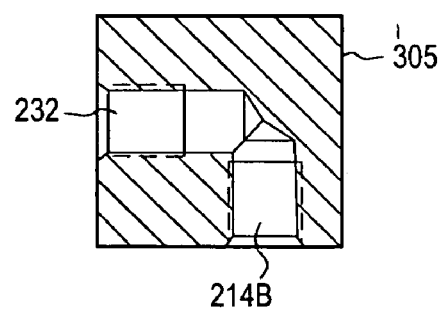
Figure 8C:
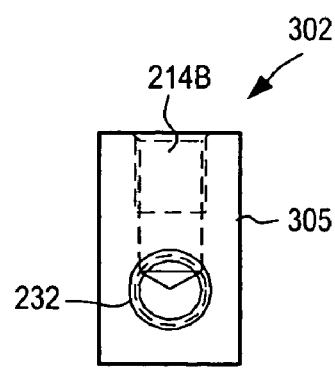

FIG. 8A depicts a cross-sectional representation of high-pressure side 302 of assembly 200 from a front-end view. As shown in FIG. 8A, high-pressure side 300 may include high-pressure body 305. FIG. 8B depicts a cross-sectional representation of high-pressure body 305 along line A—A depicted in FIG. 8A. FIG. 8C depicts a cross-sectional representation of high-pressure body 305 from a bottom view.

In certain embodiments, high-pressure body 305 may be a cast body (e.g., an aluminum die-cast body). High-pressure body 305 may include opening 232. A gauge (e.g., gauge 208 depicted in FIGS. 4 and 5) may be coupled to opening 232. Opening 232 may be threaded (e.g., a ⅛" NPT female thread) to allow a gauge to be coupled to the opening. Opening 232 may be in fluid communication with opening 214B, as shown in FIGS. 6, 8A, and 8B. Opening 214B may be threaded (e.g., a ⅛" NPT female thread) to allow for coupling to the opening.

In an embodiment, assembly 200 may include an outer body (e.g., outer body 202 shown in FIGS. 4 and 5) that encloses low-pressure body 304 and high-pressure body 305. An outer body may be formed as a single piece including means for placing low-pressure body 304 and high-pressure body 305 inside the outer body. In certain embodiments, an outer body may include 2 or more pieces that are coupled together to form the outer body. FIGS. 9A–10C depict an embodiment of an outer body that includes two pieces coupled together to form the outer body. FIGS. 9A–9C depict cross-sectional representations of an embodiment of outer body front portion 202A. FIG. 9A depicts a cross-sectional representation of an embodiment of outer body front portion 202A from a front-end view. FIG. 9B depicts a cross-sectional representation of outer body front portion 202A along line A—A depicted in FIG. 9A. FIG. 9C depicts a cross-sectional representation of outer body front portion 202A along line B—B depicted in FIG. 9A.

As shown in FIGS. 9A–9C, outer body front portion 202A may include opening 236B that corresponds to opening 236 of low-pressure body 304, depicted in FIGS. 7A–7D. Outer body front portion 202A may include opening 232B that corresponds to opening 232 of high-pressure body 305, depicted in FIGS. 8A–8C. Outer body front portion 202A may include front portions of openings 204C, 210C, 212C, 214C that correspond to openings 204B, 210B, 212B, 214B, depicted in FIGS. 6–8C. In certain embodiments, outer body front portion 202A may include front portions 222A, 224A of low-pressure side storage fitting 222 and/or high-pressure side storage fitting 224 (shown in FIGS. 4 and 5).

Outer body front portion 202A may be a molded body (e.g., an injection molded plastic body) or a cast body (e.g., an aluminum die cast body). As shown in FIGS. 9A–9C, outer body front portion 202A may include front portion couplers 340A. Front portion couplers 340A may be used for coupling outer body front portion 202A to outer body rear portion 202B, shown in FIGS. 10A–10C. In some embodiments, front portion couplers 340A may include female threading for coupling to a screw or bolt.

FIGS. 10A–10C depict cross-sectional representations of an embodiment of outer body rear portion 202B. FIG. 10A depicts a cross-sectional representation of an embodiment of outer body rear portion 202B from a front-end view. FIG. 10B depicts a cross-sectional representation of outer body rear portion 202B along line A—A depicted in FIG. 10A. FIG. 10C depicts a cross-sectional representation of outer body rear portion 202B along line B—B depicted in FIG. 10A.

Outer body rear portion 202B may be a molded body (e.g., an injection molded plastic body) or a cast body (e.g., an aluminum die cast body). Outer body rear portion 202B may include rear portions of openings 204C, 210C, 212C, 214C that correspond to openings 204B, 210B, 212B, 214B, depicted in FIGS. 6–8C. In certain embodiments, outer body rear portion 202B may include rear portions 222B, 224B of low-pressure side storage fitting 222 and/or high-pressure side storage fitting 224 (shown in FIGS. 4 and 5).

As shown in FIGS. 10A–10C, outer body rear portion 202B may include rear portion couplers 340B. Rear portion couplers 340B may be used for coupling outer body rear portion 202B to outer body front portion 202A, shown in FIGS. 9A–9C. In some embodiments, rear portion couplers 340B may be recesses that function as washers for screws or bolts to couple outer body rear portion 202B to outer body front portion 202A.

FIGS. 11A–11D depict an embodiment of plunger 238 that may be used in opening 236, depicted in FIGS. 6–7D. FIG. 11A depicts a cross-sectional representation of an embodiment of plunger 238 from an end-on view. FIG. 11B depicts a side view of an embodiment of plunger 238. FIG. 11C depicts a cross-sectional representation of an embodiment of plunger 238 from a side view. FIG. 11D depicts an expanded cross-sectional representation of an embodiment of plunger 238 along line A—A depicted in FIG. 11A.

Plunger 238 may be placed in opening 236 (depicted in FIGS. 7A–7D) to allow a gauge (e.g., gauge 206 depicted in FIGS. 4 and 5) to be coupled to the opening. Plunger 238 may have a shape substantially similar to an interior shape of opening 236, as shown in FIGS. 7A–7D and 11A–11D. Plunger 238 may have outer dimensions substantially similar to the dimensions of walls of opening 236 so that the plunger may fit snugly in the opening. Plunger 238 may include sealing grooves 248A–C. Sealing grooves 248A–C may be, for example, o-ring grooves. O-rings or another sealing material may be placed in sealing grooves 248A–C so that a seal is made between plunger 238 and the walls of opening 236. Plunger 238 may have end 245 at a forward portion of the plunger. End 245 may have a shape that appropriately matches a shape of diameter 245B of opening 236, shown in FIG. 7D.

Plunger 238 may include coupling portion 250. Coupling portion 250 may be used to couple plunger 238 to a gauge (e.g., gauge 206 depicted in FIGS. 4 and 5). In certain embodiments, coupling portion 250 may be a threaded portion so that a gauge may be coupled by threading the gauge into the coupling portion. For example, coupling portion 250 may be a female threaded ⅛" NPT fitting.

In certain embodiments, plunger 238 may include opening 239. Opening 239 may allow fluids to enter interior 240 of plunger 238. Thus, a gauge (e.g., gauge 206 depicted in FIGS. 4 and 5) coupled to plunger 238 may be used to measure a pressure of fluid (e.g., refrigerant gas or refrigerant liquid) in interior 240 of the plunger and openings in fluid communication with interior 240 through opening 239. For example, a gauge may measure a pressure of fluid in opening 210B when interior 240 is in fluid communication with opening 210B. Thus, a gauge may be used to indicate a pressure of fluid in opening 210B and components coupled to opening 210B (e.g., a low-pressure side of a refrigerant system).

Plunger 238 may include groove 246. Groove 246 may be used as a guide for operation of plunger 238 within opening 236. In certain embodiments, groove 246 may have a design (e.g., a shape and length) that controls the movement of plunger 238. For example, groove 246 may include first and second ends so that movement of plunger 238 is limited by the first and second ends. Pins or other extending devices (e.g., pin 241 shown in FIGS. 12A and 12B) may be placed in holes 244, shown in FIG. 7D, for simultaneous use as guides for groove 246. In some embodiments, one pin or one extending device may be placed in one of holes 244 as a guide for groove 246.

Figure 12B:
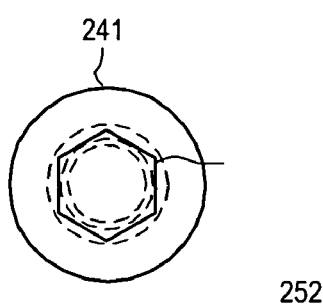
FIGS. 12A and 12B depict cross-sectional representations of an embodiment of a pin.
Figure 12A:
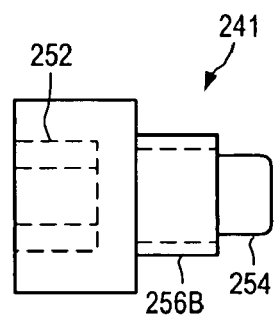

FIGS. 12A and 12B depict cross-sectional representations of an embodiment of pin 241. Pin 241 may be placed in hole 244, shown in FIG. 7D, to guide movement of plunger 238, shown in FIGS. 11A–11D. Pin 241 may include threaded portion 256B. Threaded portion 256B may mate with threaded portion 256A of hole 244, shown in FIG. 7D. Pin 241 may include opening 252. Opening 252 may include, for example, a hex wrench design, a star wrench design, or other similarly designed female fitting used to rotate pin 241 into hole 244 along threaded portions 256A, 256B. Extension 254 may extend into opening 236 such that the extension enters groove 246 of plunger 238, as shown in FIGS. 13A and 13B.

Figure 13A:
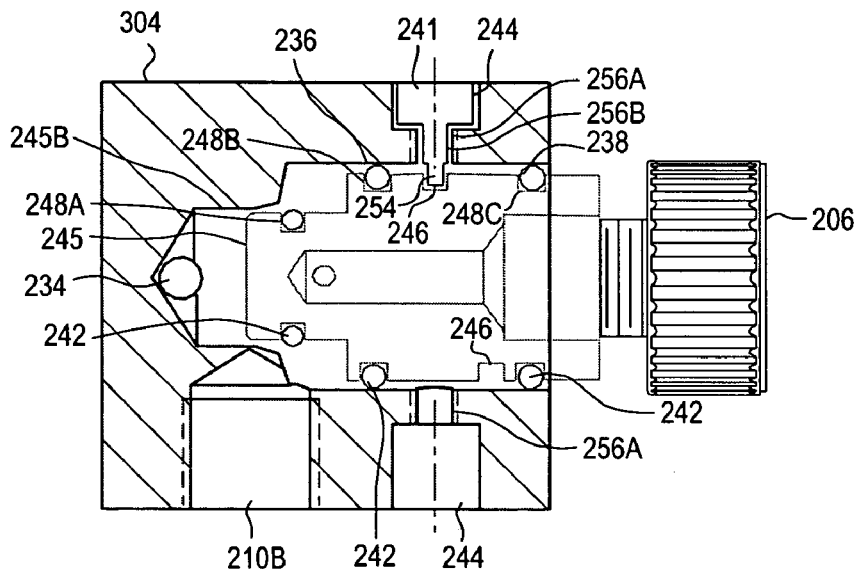
FIG. 13A depicts an embodiment of a plunger in an opening in an open fluid flow position.
Figure 13B:
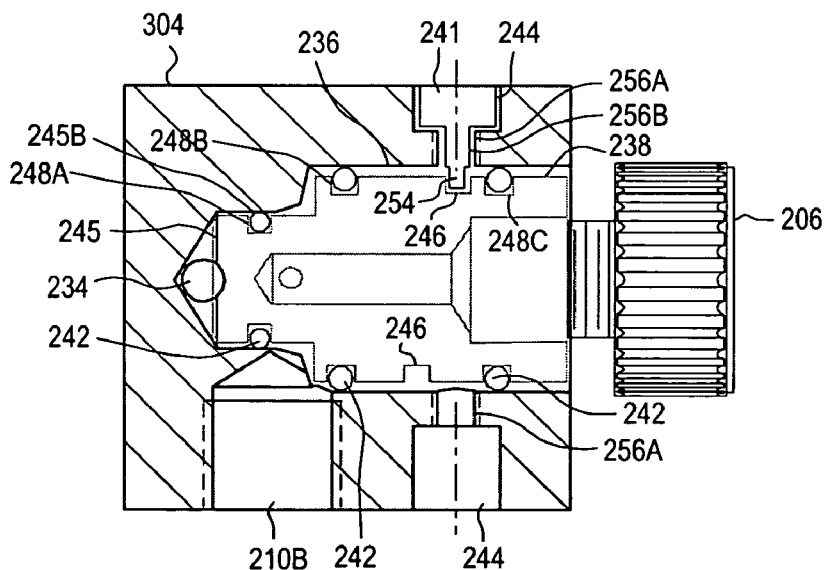
FIG. 13B depicts an embodiment of a plunger in an opening in a closed fluid flow position.

FIGS. 13A and 13B depict embodiments of plunger 238 in opening 236 in an open fluid flow position (FIG. 13A) and a closed fluid flow position (FIG. 13B). Pin 241 may be used as a guide for groove 246 so that as plunger 238 is rotated, the plunger moves back and forth along a length of opening 236 according to a shape of the groove. Thus, plunger 238 may be used to open and close fluid flow between opening 234 and opening 210B (i.e., plunger 238 may operate as a valve to open and close fluid flow between opening 234 and opening 210B). In certain embodiments, rotation of gauge 206 may rotate plunger 238 and cause movement of the plunger back and forth along a length of opening 236. Thus, gauge 206 may be used as a handle for operating plunger 238 and opening or closing the flow of fluid between opening 234 and opening 210B.

As shown in FIG. 13B, fluid flow may be closed off when end 245 of plunger 238 is moved inside diameter 245B such that o-ring 242 located in sealing groove 248A inhibits fluid flow between opening 234 and opening 210B. As shown in FIG. 13A, fluid flow may be allowed between opening 234 and opening 210B when end 245 of plunger 238 is moved out of or almost out of diameter 245B sufficiently far enough such that o-ring 242 in sealing groove 248A does not inhibit flow between opening 234 and opening 210B. O-rings 242 located in sealing grooves 248B, 248C may form a seal against walls of opening 236 to inhibit fluid from exiting the opening.

Figure 14:
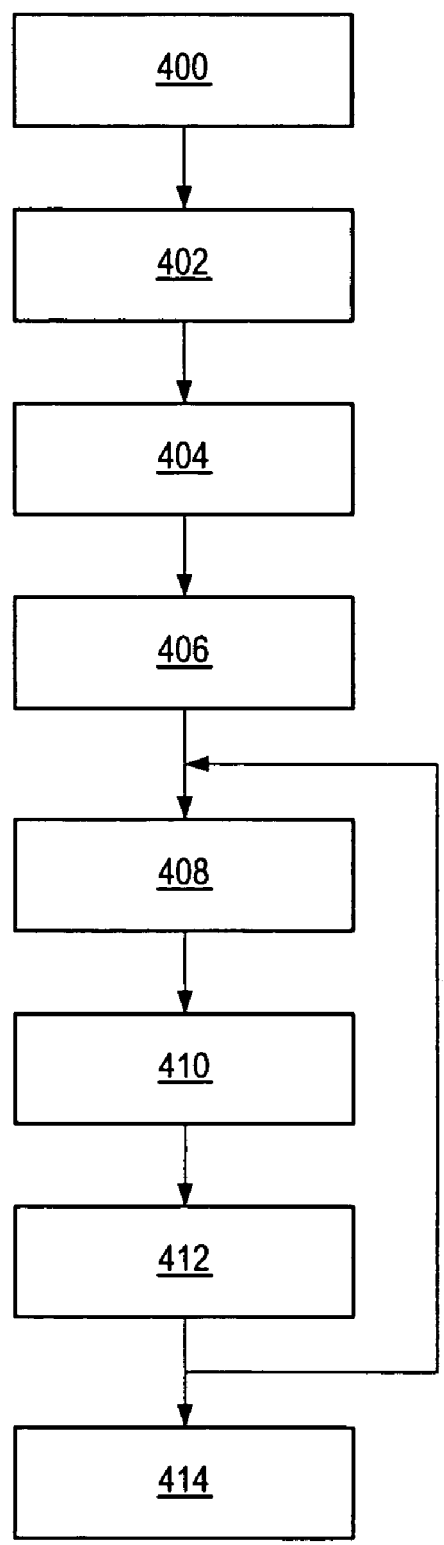
FIG. 14 depicts a flowchart of an embodiment of a method for pressure testing and/or recharging a refrigerant system.

In certain embodiments, assembly 200 may be used both for measuring low-pressure side and high-pressure side pressures of a refrigerant system (e.g., a motor vehicle refrigerant system) and for controllably charging the refrigerant system using a refrigerant can. FIG. 14 depicts a flowchart of an embodiment of a method for pressure testing and/or recharging a refrigerant system (e.g., a motor vehicle refrigerant system) using assembly 200. The steps in the method depicted in FIG. 14 may reference elements identified in the embodiments depicted in FIGS. 4–13. The pressure of a low-pressure side or a high-pressure side of a refrigerant system may be measured with or without a refrigerant can coupled to assembly 200.

In step 400, a user may turn on a refrigerant system (e.g., a motor vehicle refrigerant system) and set the refrigerant system to maximum cooling. Care should be taken by the user to ensure the compressor clutch of the refrigerant system is engaged. If the compressor clutch is not engaged, a user may add up to about one can of refrigerant until the compressor clutch becomes engaged. If the compressor clutch does not become engaged after adding refrigerant, a user may seek repair for the refrigerant system.

After turning on the refrigerant system, a user may couple assembly 200 to the refrigerant system by coupling device 132 to an inlet port on a low-pressure side of the refrigerant system and coupling device 226 to an inlet port on a high-pressure side of the refrigerant system (step 402). In certain embodiments, assembly 200 may be coupled to the refrigerant system with shutoff valves 228 closed (e.g., to inhibit accidental loss of refrigerant). Coupling devices 132, 226 may be of different sizes to match the inlet port fittings for the low-pressure side and the high-pressure side of the refrigerant system, respectively. These differing sizes may inhibit a user from accidentally coupling gauges 206, 208 to the wrong inlet ports.

After coupling assembly 200 to the inlet ports of the refrigerant system, a user may measure pressure in the low-pressure side of the refrigerant system and/or the high-pressure side of the refrigerant system (step 404). Shutoff valves 228 may be opened if previously closed. A user may compare these pressures to a chart or other supplied reference to determine if refrigerant is needed and, if so, how much refrigerant may be needed to recharge the refrigerant system.

If additional refrigerant is needed, a user may couple a refrigerant can (e.g., an R-134a refrigerant can for an R-134a refrigerant system) to assembly 200 with valve 230 (step 406). Valve 230 may pierce the refrigerant can and, in some embodiments, may be used as a shutoff valve for the refrigerant can.

The user may rotate gauge 206 a selected rotation in a first direction (e.g., a ¼ turn counterclockwise) to allow refrigerant to flow from the refrigerant can to the low-pressure side of the refrigerant system (step 408). In certain embodiments, refrigerant may be added in small increments. This may inhibit overcharging of the refrigerant system. The user may rotate gauge 206 the selected rotation in an opposite direction to the first direction (e.g., a ¼ turn clockwise) to stop the flow of refrigerant to the low-pressure side of the refrigerant system (step 410). In some embodiments, the user may use valve 230 to reduce or stop the flow of refrigerant.

The user may measure the low-pressure side pressure using gauge 206 after stopping the flow of refrigerant (step 412). If the pressure of refrigerant remains too low, steps 408–412 may be repeated until a sufficient pressure (i.e., a sufficient charge of refrigerant) is achieved. After sufficiently filling the refrigerant system with refrigerant, assembly 200 may be uncoupled from the refrigerant system (step 414). Shutoff valves 228 and/or valve 230 may be closed before uncoupling assembly 200 from the refrigerant system to inhibit accidental leakage of refrigerant from the assembly and/or from the refrigerant system.

An empty refrigerant can may be uncoupled from assembly 200 and disposed of properly. Assembly 200 may be stored with shutoff valves 228 closed and valve 230 closed. This may inhibit accidental leakage of refrigerant from assembly 200. If the refrigerant can is not empty, the refrigerant can may remain coupled to assembly 200 for later use. Care should be taken in storing assembly 200 and the refrigerant can so that the refrigerant can is not accidentally opened or punctured.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A combination pressure measurement/charging system, comprising:
    a conduit configured to be coupled to a refrigerant can and to a low-pressure side of a refrigerant system;
    a valve configured to control a flow of fluid through the conduit and, thus, between the refrigerant can and the low-pressure side of the refrigerant system, wherein the valve is further configured to allow a pressure of the low-pressure side of the refrigerant system to be assessed when the valve is closed;
    a first pressure gauge in fluid communication with the conduit and configured to be coupled to the low-pressure side of the refrigerant system, wherein the first pressure gauge is configured to operate the valve to control fluid flow through the conduit; and
    a second pressure gauge, wherein the second pressure gauge is configured to be coupled to a high-pressure side of the refrigerant system, and wherein the second pressure gauge is isolated from fluids that flow through the conduit.

2. The system of claim 1, further comprising a body, wherein the conduit and the valve are located inside the body, and wherein the first pressure gauge and the second pressure gauge are coupled to the body.

3. The system of claim 1, further comprising a hose coupled to the conduit, wherein the hose is configured to be coupled to a refrigerant can.

4. The system of claim 3, further comprising a can piercing valve coupled to the hose.

5. The system of claim 1, further comprising a hose coupled to the first pressure gauge, wherein the hose is configured to be coupled to the low-pressure side of the refrigerant system.

6. The system of claim 5, further comprising a shutoff valve coupled to the hose.

7. The system of claim 5, further comprising a quick coupling device coupled to the hose, wherein the quick coupling device is configured to be coupled to the low-pressure side of the refrigerant system.

8. The system of claim 1, further comprising a hose coupled to the second pressure gauge, wherein the hose is configured to be coupled, to the high-pressure side of the refrigerant system.

9. The system of claim 8, further comprising a shutoff valve coupled to the hose.

10. The system of claim 8, further comprising a quick coupling device coupled to the hose, wherein the quick coupling device is configured to be coupled to the high-pressure side of the refrigerant system.

11. The system of claim 1, wherein the first pressure gauge is configured to indicate a pressure of the low-pressure side of the refrigerant system.

12. The system of claim 1, wherein the second pressure gauge is configured to indicate a pressure of the high-pressure side of the refrigerant system.

13. The system of claim 1, wherein the first pressure gauge is configured as a handle for operating the valve.

14. The system of claim 1, wherein the first pressure gauge comprises a handle for opening and closing the valve.

15. The system of claim 1, wherein the first pressure gauge is configured to rotate to open and close the valve.

16. The system of claim 1, wherein the valve is configured to allow fluid to flow from the refrigerant can to the low-pressure side of the refrigerant system when the valve is open.

17. The system of claim 1, wherein the valve comprises a plunger in an opening, and wherein the valve is configured to be closed when a portion of the plunger seals against the wall to inhibit fluid flow between the refrigerant can and the low-pressure side of the refrigerant system.

18. The system of claim 17, wherein the plunger is coupled to the first pressure gauge, and wherein an interior of the plunger is in fluid communication with the first pressure gauge.

19. The system of claim 18, wherein the plunger is configured to be moved back and forth in the opening by rotating the first pressure gauge.

20. The system of claim 18, wherein the plunger is configured to be moved back and forth in the opening, thus opening and closing the valve, by rotating the first pressure gauge.

21. The system of claim 18, wherein the plunger comprises an opening configured to allow fluid into an interior of the plunger such that the first pressure gauge can indicate the pressure of the fluid.

22. A method for pressure testing/refrigerant charging a refrigerant system, comprising:
   coupling a pressure testing/refrigerant charging assembly to a refrigerant system, wherein the assembly comprises:
      a conduit coupled to a low-pressure side of the refrigerant system, wherein the conduit is configured to be coupled to a refrigerant can;
      a valve to control a flow of fluid through conduit and, thus, between the refrigerant can and the low-pressure side of the refrigerant system;
      a first pressure gauge in fluid communication with the conduit and coupled to the low-pressure side of the refrigerant system, wherein the first pressure gauge operates the valve to control fluid flow through the conduit; and
      a second pressure gauge, wherein the second pressure gauge is coupled to a high-pressure side of the refrigerant system, and wherein the second pressure gauge is isolated from fluids that flow through the conduit;
   assessing a pressure of the low-pressure side of the refrigerant system using the first pressure gauge;
   assessing a pressure of the high-pressure side of the refrigerant system using the second pressure gauge;
   coupling a refrigerant can to the conduit if the refrigerant level in the refrigerant system is below a desired level;
   opening the valve to allow refrigerant to flow into the low-pressure side of the refrigerant system from the refrigerant can; and
   closing the valve to assess the low-pressure side pressure of the refrigerant system after allowing at least some refrigerant to enter the refrigerant system.

23. The method of claim 22, further comprising coupling the refrigerant can to the conduit using a hose and a can piercing valve.

24. The method of claim 22, further comprising coupling the first pressure gauge to the low-pressure side of the refrigerant system using a hose and a shutoff valve.

25. The method of claim 24, further comprising coupling the hose to the low-pressure side of the refrigerant system using a quick coupling device.

26. The method of claim 24, further comprising opening the shutoff valve before assessing the pressure of the low-pressure side of the refrigerant system.

27. The method of claim 22, further comprising coupling the second pressure gauge to the high-pressure side of the refrigerant system using a hose and a shutoff valve.

28. The method of claim 27, further comprising coupling the hose to the high-pressure side of the refrigerant system using a quick coupling device.

29. The method of claim 27, further comprising opening the shutoff valve before assessing the pressure of the high-pressure side of the refrigerant system.

30. The method of claim 22, further comprising assessing the pressure of low-pressure side of the refrigerant system after closing the valve and opening the valve to allow more refrigerant to flow into the low-pressure side of the refrigerant system if the refrigerant level of the refrigerant system is below a desired level.

31. The method of claim 22, further comprising uncoupling the pressure testing/refrigerant charging assembly from the refrigerant system after a sufficient pressure of refrigerant has been achieved in the refrigerant system.

32. The method of claim 31, further comprising storing the pressure testing/refrigerant charging assembly with the refrigerant can coupled to the assembly if the refrigerant can is not empty.

33. The method of claim 22, further comprising uncoupling the refrigerant can from the pressure testing/refrigerant charging assembly after the refrigerant can has been emptied.

34. The method of claim 22, further comprising using the pressure gauge as the handle to open or close the valve.

35. The method of claim 22, further comprising rotating the pressure gauge to open or close the valve.

* * * * *